(12) United States Patent
Cornelissen et al.

(10) Patent No.: US 10,948,148 B2
(45) Date of Patent: Mar. 16, 2021

(54) LIGHTING DEVICE WITH MULTIPLE-FOCUS MODE

(71) Applicant: LUMILEDS HOLDING B.V., Eindhoven (NL)

(72) Inventors: Hugo Johan Cornelissen, Aachen (DE); Achim Hilgers, Aachen (DE); Floris Maria Hermansz Crompvoets, Aachen (DE); Norbertus Antonius Maria Sweegers, Aachen (DE); Marc Andre De Samber, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 15/575,096

(22) PCT Filed: May 11, 2016

(86) PCT No.: PCT/EP2016/060516
§ 371 (c)(1),
(2) Date: Nov. 17, 2017

(87) PCT Pub. No.: WO2016/188746
PCT Pub. Date: Dec. 1, 2016

(65) Prior Publication Data
US 2018/0156411 A1 Jun. 7, 2018

(30) Foreign Application Priority Data
May 26, 2015 (EP) .................................. 15169096

(51) Int. Cl.
*F21S 41/143* (2018.01)
*B60Q 1/08* (2006.01)
(Continued)

(52) U.S. Cl.
CPC .......... *F21S 41/143* (2018.01); *B60Q 1/0011* (2013.01); *B60Q 1/04* (2013.01);
(Continued)

(58) Field of Classification Search
CPC .......... F21S 43/243; F21S 41/25; F21S 43/14; F21S 41/43; B06Q 1/0011; B06Q 1/04; B60Q 2400/50
See application file for complete search history.

(56) References Cited

U.S. PATENT DOCUMENTS 5,724,161 A * 3/1998 Smith ................ G02B 27/0103
349/34
8,317,379 B2 * 11/2012 Oomen ................. F21S 43/235
362/518

(Continued)

FOREIGN PATENT DOCUMENTS

CN 101932874 A 12/2010
CN 102834662 A 12/2012

(Continued)

OTHER PUBLICATIONS

EPO as ISA, "International Search Report and Written Opinion" dated Jul. 21, 2016 from International Application No. PCT/EP2016/060516, filed May 11, 2016, 14 pages.

(Continued)

*Primary Examiner* — Thien M Le
*Assistant Examiner* — Asifa Habib

(57) ABSTRACT

The present invention relates to a lighting device, in particular a headlamp for vehicles, at least comprising an array of light sources, consisting of first and second light sources being mounted within the same flat or curved plane, and a projecting optical system arranged to project light emitted by the light sources in a forward direction of the lighting device. At least one shifting element is arranged in front of said first light sources. The shifting element generates real or virtual emission positions of the light of said first light sources shifted towards or away from the projecting optical system with respect to emission positions of said second light sources. With the proposed lighting device, in addition (Continued)

to the main lighting function of illumination, a pattern or signature can be projected at one or several additional image planes. The lighting device thus e.g. allows the additional projection of branding or safety patterns.

20 Claims, 3 Drawing Sheets

(51) Int. Cl.
*F21S 41/24* (2018.01)
*F21S 41/663* (2018.01)
*F21S 41/43* (2018.01)
*F21S 41/255* (2018.01)
*F21S 41/153* (2018.01)
*F21S 41/25* (2018.01)
*F21S 43/243* (2018.01)
*B60Q 1/00* (2006.01)
*B60Q 1/04* (2006.01)
*F21V 8/00* (2006.01)
*F21W 131/406* (2006.01)
*G02B 6/06* (2006.01)
*F21Y 105/10* (2016.01)
*F21Y 107/10* (2016.01)
*F21W 103/60* (2018.01)
*F21S 43/14* (2018.01)

(52) U.S. Cl.
CPC ............ *B60Q 1/085* (2013.01); *F21S 41/153* (2018.01); *F21S 41/24* (2018.01); *F21S 41/25* (2018.01); *F21S 41/255* (2018.01); *F21S 41/43* (2018.01); *F21S 41/663* (2018.01); *F21S 43/243* (2018.01); *B60Q 2400/50* (2013.01); *F21S 43/14* (2018.01); *F21W 2103/60* (2018.01); *F21W 2131/406* (2013.01); *F21Y 2105/10* (2016.08); *F21Y 2107/10* (2016.08); *G02B 6/0005* (2013.01); *G02B 6/0096* (2013.01); *G02B 6/06* (2013.01)

(56) References Cited

U.S. PATENT DOCUMENTS

| | | | |
|---|---|---|---|
| 9,030,749 B2* | 5/2015 | Lescure | G02B 27/0101 359/630 |
| 9,587,795 B2 | 3/2017 | Ohsawa et al. | |
| 9,732,923 B2 | 8/2017 | Schug et al. | |
| 9,827,901 B1* | 11/2017 | Thompson | G03B 29/00 |
| 10,055,867 B2* | 8/2018 | Law | H04N 13/275 |
| 10,336,242 B2* | 7/2019 | Canonne | B60K 37/06 |
| 10,414,328 B2* | 9/2019 | Kim | B60Q 11/005 |
| 10,427,601 B2* | 10/2019 | Kimura | E01H 5/098 |
| D878,640 S* | 3/2020 | Imaishi | D26/28 |
| 10,640,034 B1* | 5/2020 | Mouri | B60Q 1/143 |
| 2004/0145911 A1* | 7/2004 | Cibie | F21S 41/43 362/520 |
| 2005/0180154 A1* | 8/2005 | Albou | F21S 41/695 362/514 |
| 2007/0019430 A1* | 1/2007 | Meyrenaud | F21S 41/43 362/516 |
| 2007/0263402 A1* | 11/2007 | de Lamberterie | F21S 41/28 362/509 |
| 2008/0198372 A1* | 8/2008 | Pan | B60Q 1/38 356/121 |
| 2009/0147529 A1* | 6/2009 | Ajiki | F21S 41/24 362/511 |
| 2014/0016340 A1 | 1/2014 | Cho et al. | |
| 2014/0362600 A1* | 12/2014 | Suckling | F21S 41/143 362/583 |
| 2015/0043239 A1 | 2/2015 | Han | |
| 2015/0219300 A1 | 8/2015 | Kishi et al. | |
| 2015/0226395 A1* | 8/2015 | Taudt | F21S 41/265 362/511 |
| 2015/0375672 A1* | 12/2015 | Takahashi | F21S 41/675 701/49 |
| 2016/0140760 A1* | 5/2016 | Bowden | B60R 1/00 345/633 |
| 2016/0290583 A1* | 10/2016 | Suwa | F21S 41/43 |
| 2017/0343172 A1* | 11/2017 | Schug | F21S 41/275 |

FOREIGN PATENT DOCUMENTS

| | | |
|---|---|---|
| CN | 103090286 A | 5/2013 |
| CN | 104006342 A | 8/2014 |
| DE | 102009018379 B3 | 10/2010 |
| DE | 102010044062 A1 | 5/2012 |
| DE | 102012025354 A1 | 7/2014 |
| EP | 1403135 A2 | 3/2004 |
| EP | 2492580 A2 | 8/2012 |
| EP | 2772682 A2 | 2/2014 |
| EP | 2846081 A1 | 3/2015 |
| JP | 2007234562 A | 9/2007 |
| JP | 2008288224 A | 11/2008 |
| JP | 2010095048 A | 4/2010 |
| JP | 2011030303 A | 5/2011 |
| JP | 2011090903 A | 5/2011 |
| JP | 2013168434 A | 8/2013 |
| JP | 2014189198 A | 10/2014 |
| JP | 2015526868 A | 9/2015 |
| WO | 2012038173 A1 | 3/2012 |
| WO | 2012/077274 A1 | 6/2012 |
| WO | 2013080158 A1 | 6/2013 |
| WO | 2014/033834 A1 | 3/2014 |
| WO | 2014032071 A1 | 3/2014 |
| WO | 2015040671 A1 | 3/2015 |
| WO | 2015086307 A1 | 6/2015 |

OTHER PUBLICATIONS

Extended European Search Report dated Oct. 29, 2015 from European Patent Application No. 15169096.3 filed May 26, 2015, 6 pages.
Article 94(3) EPC dated Jul. 9, 2018, European Patent Application No. 16725394.7, 5 pages.
Article 94(3) EPC dated Mar. 21, 2019, European Application No. 16725394.7, 7 pages.
First Office Action dated Oct. 25, 2019, Chinese Patent Application No. 201680030471.4, 12 pages.

* cited by examiner

LIGHTING DEVICE WITH MULTIPLE-FOCUS MODE

CROSS-REFERENCE TO RELATED APPLICATIONS

The present application is a § 371 application of International Application No. PCT/EP2016/060516 filed on May 11, 2016 and titled "LIGHTING DEVICE WITH MULTIPLE-FOCUS MODE," which claims the benefit of European Patent Application No. 15169096.3 filed on May 26, 2015. International Application No. PCT/EP2016/060516 and European Patent Application No. 15169096.3 are incorporated herein.

BACKGROUND OF THE INVENTION

The present invention relates to a lighting device, in particular to a headlamp for vehicles, at least comprising an array of light sources and a projecting optical system arranged to project light emitted by the light sources in a forward direction of the lighting device.

Future headlight systems for automotive front-lighting will contain intelligent dynamic functionalities of which some are already known on the market as cornering light, adaptive high beam and pixelated light, or adaptive front-lighting system (AFS). These lighting systems are enabled by one or more matrix LED arrays (LED: light emitting diode). Optical separation of the light point sources of the LED array into separate elements is required to create well-defined distinguishable patterns for the above mentioned applications. Next to individual addressing, also combinations of individual elements of the matrix array can be made as to create the required beam pattern.

At present there is a need to provide headlamps for motor vehicles which in addition to the main lighting function of illumination of the road for vision reasons also allows to project a signature at a closer distance on the road. Such a signature may for example provide other persons like pedestrians, bikers or other car drivers with visual information, e.g. information about the car type/logo, a safety warning, etc.

FIG. 1 exemplary shows the situation when projecting light with a headlamp comprising a LED matrix array. The LED matrix array 1 is mounted in a plane called the object plane. FIG. 1 in this example only shows two LEDs 2 of such a LED matrix array. A projection lens 3 is used to image this object plane to an image plane 4 in the far-field, e.g. at 25 or 50 meters distance (see FIG. 1B). As a consequence, the image will not appear sharp at a near-by distance of e.g. 5 or 10 meters (near-by image plane 5). A sharp image in this near-by image plane 5 would require another position of the projection lens 3 as indicated in FIG. 1A. This however would prohibit a sharp projection in the far-field image plane 4. In order to project a safety feature like a warning sign or a brand image like an icon at a near-by distance in addition to the far-field projection of the main beam, typically a separate optical system of light source and projection lens would be required. It is however often not possible or desired to accommodate such an extra system in the front of a car.

DE 10 2012 025 354 A1 describes a headlamp comprising such a double functionality. In addition to the common light projection for illumination, light or shadow spots are projected at a closer distance on the road. The distance of these spots can be varied depending on the velocity of the car. For generating light spots or shadow spots the use of an additional lens or light shade arrangement in front of the glow filament light source of the headlamp is proposed. Alternatively the document proposes to include an additional light source like a laser for generating the light spots.

SUMMARY OF THE INVENTION

It is an object of the invention to provide a lighting device that enables the sharp projection of a signature or light pattern at one or several distances ahead of the lighting device in addition to the main lighting function of illumination without the need of an additional projection system.

The object is achieved with the lighting device according to claim 1. Advantageous embodiments of the lighting device are subject matter of the dependent claims or are described in the subsequent portions of the description and preferred embodiments.

The proposed lighting device, which is preferably designed as a headlamp for vehicles, in particular motor vehicles, at least comprises an array of light sources, consisting of first and second light sources, and a projecting optical system arranged to project light emitted by the light sources in a forward direction of the device. In the proposed device at least one shifting element is arranged in front of said first light sources, said shifting element generating real or virtual emission positions of the light of said first light sources shifted towards or away from said projecting optical system with respect to emission positions of said second light sources.

With the proposed shifting element(s) which are arranged between the first light sources and the projecting optical system the emission positions of the light sources, in particular individual LEDs or groups of LEDs of an LED matrix array, are relayed onto various different object planes. The projecting optical system then creates images at various corresponding image planes. Individual light sources of the array of light sources are thus in focus at individual distances from the lighting device, e.g. in case of the headlamp of a car at different distances from the car. It is thus possible to fulfil the main function of illumination e.g. by focusing a large number of the light sources (being relayed to the same object plane) to the far-field, and at the same time generating light patterns or signatures at one or several different image planes, e.g. image planes closer to the device, with the remaining light sources.

The projecting optical system may be formed of one or several lenses or of an appropriate reflector optics. The array of light sources is preferably a 2-dimensional array, but may also be a 1-dimensional array, i.e. light sources arranged in line.

The proposed solution does not require any additional optical device with additional light sources. Contrary to solutions where a changed focus can be realized by different mounting positions of the LEDs regarding the distances to the projecting optical system, it allows the light sources or LEDs to be mounted within the same plane, e.g. on a common PCB board (PCB: printed circuit board). This is advantageous from manufacturability and from a thermal management point of view. In a preferred embodiment, only a single projection lens is used as the projecting optical system. The proposed lighting device thus only requires the additional shifting elements but does not require any additional optical projecting optics.

Depending on the kind of pattern or signature to be projected several of the light sources or groups of light sources of the array may share one common shifting element or the corresponding light sources may comprise individual shifting elements. Using several shifting elements it is possible to project the light of different light sources or groups of light sources to image planes at different distances ahead of the lighting device.

The shifting elements generating real emission positions of the light of said first light sources shifted towards said projecting optical system may be formed of an optical waveguide. The emission face of this waveguide then represents a new point-like light source which is closer to said projecting optical system than the originating light source. Alternatively to optical waveguides or optical fibers, also hollow reflective micro-tubes, light guiding optical rods, micro-fiber plates or light guide manifolds may be used for example as said shifting elements. Nevertheless, also other appropriate means may be used to generate the shifting.

An example for a shifting element generating virtual emission positions of the light of said first light sources shifted away from said projecting optical system is a converging lens. Using such a converging lens the light emission position viewed from the projecting optical system is moved away from the projecting optical system resulting in an image plane closer to the projecting optical system.

The proposed lighting device may be used for example for so called brand imaging of a headlamp of a motor vehicle. The proposed multiple-focus optics can be used to emphasize brand specific characteristics like icons, signs, etc., since different patterns can be visualized at different distances from the motor vehicle. This makes it possible to visualize a different object for a viewer, e.g. at 1 meter, 10 meters and 100 meters from the vehicle. Also safety information can be projected in front of the headlamp/vehicle. With the multiple-focus optics also dynamic information in the various images can be visualized, e.g. sharp safety stripes projected on the road at various distances ahead, turning lights projected on the road etc.

BRIEF DESCRIPTION OF THE DRAWINGS

The proposed lighting device is described in the following by way of examples in connection with the accompanying figures. The figures show.

DETAILED DESCRIPTION OF THE INVENTION

Figure 1A:
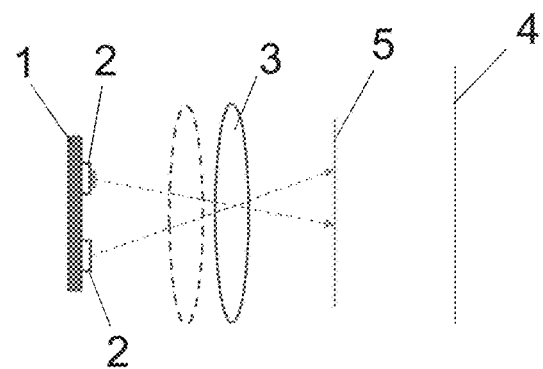
FIG. 1A/B a LED matrix of a headlamp with a projection lens according to the prior art.
Figure 1B:
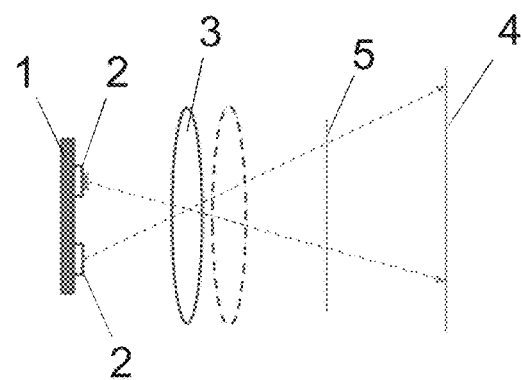
Figure 2:
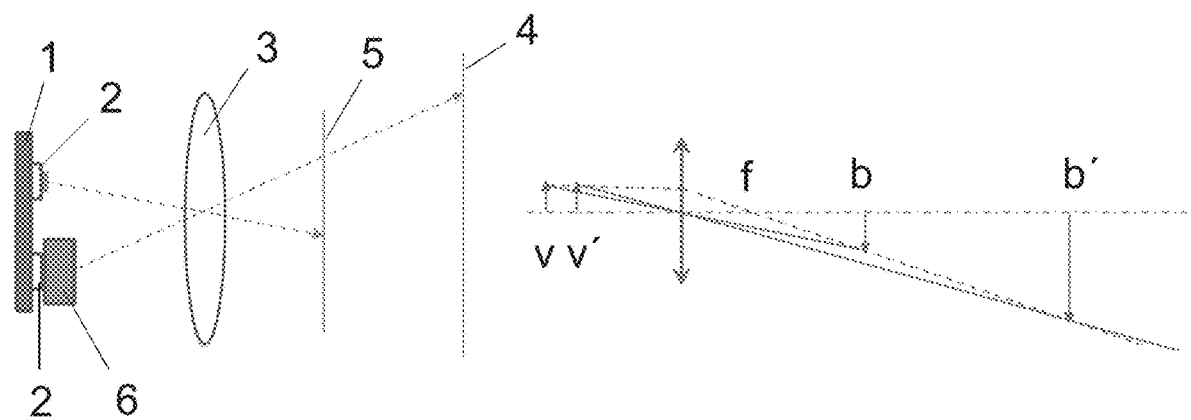
FIG. 2 the principle of operation of the multiple-focus optical system of the proposed lighting device.

The problems of prior art headlamps for projection of additional signatures or patterns have already been illustrated in the introductory portion of the description in connection with FIGS. 1A and 1B. FIG. 2 shows the principle of the optical system of the proposed lighting device enabling the projection of such additional signatures or patterns to image planes different from the image plane of the main beam. The left hand side of the figure schematically shows the LED matrix 1, in this example with only two LEDs 2 for illustration purposes. The LEDs 2 are mounted on the same plane in the lighting device. The lower LED 2 is provided with a shifting element 6, also denoted as relay element in the present patent application, which shifts the light emission position of this LED to a position closer to the projecting lens 3. Upper LED 2 does not comprise such a shifting element. The light emitting positions of the two LEDs 2 are thus in different object planes which are then sharply focused by the projection lens 3 onto different image planes, near-by image plane 5 and far-field image plane 4 in this example. The imaging situation is also shown on the right hand side with the object distances v and v', the image distances b and b' and the focal distance f of the lens 3.

FIG. 5 shows examples for different shifting elements 6 which shift or relay the emission positions of a light source towards the projecting optical system. FIG. 5A illustrates the use of hollow reflective micro-tubes 7 to form the shifting elements. In this example and also in the examples of FIGS. 5B to 5D three LEDs 2 of the LED matrix 1 are shown, each of which comprising a different shifting element 6 which shifts the emission position to a different distance from the optical projecting system. Therefore, with the three different shifting elements 6 light can be projected to three different image planes, i.e. image planes at three different distances in front of the lighting device, using a common optical projecting system. With the hollow reflective micro-tubes 7 of FIG. 5A the light emitted from the LEDs 2 reflects from specular mirror walls inside the hollow reflective micro-tubes 7 and emerges at the end of the tubes.

Figure 5A:
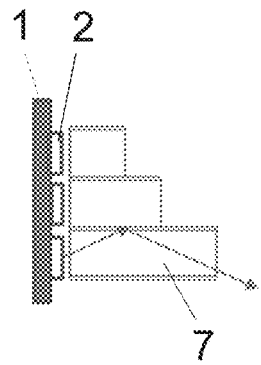
FIG. 5A-D four examples of shifting elements according to the present invention.
Figure 5B:
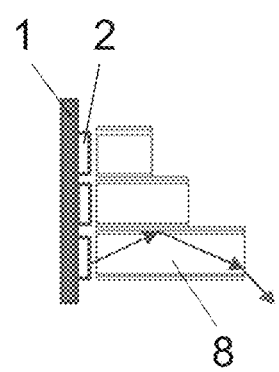

FIG. 5B shows a further example using light guiding optical rods 8 made from glass or transparent polymer as the shifting elements 6. With such light guiding optical rods 8 light reflects by total internal reflection inside of the rods. Such rods provide less losses than the hollow reflective micro-tubes of FIG. 5A, but an air gap or low index cladding is required.

Figure 5C:
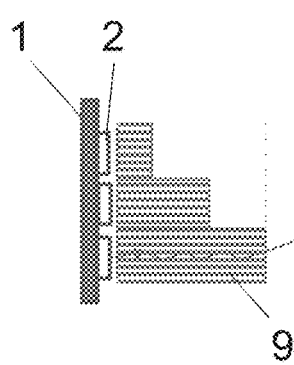

FIG. 5C shows a further example of a shifting element 6. In this example the shifting element is formed of a micro-fiber plate 9 consisting of a multitude of thin optical fibers. Such a micro-fiber plate 9 is also known as image conduit or optical fiber face plate.

Figure 5D:
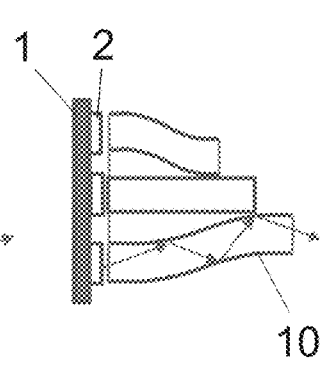

Another possibility for providing a shifting element 6 is a light guide manifold 10 comprised of bent optical fibers or light guides as schematically shown in FIG. 5D. Such an optical manifold has the additional advantage that the LEDs 2 can be spaced at some distance from each other in the LED matrix array 1. The distance of the light emitting positions can then be adapted with the light guide manifold according to the requirements. This is beneficial from a thermal and from a connectivity point of view.

All the above examples can be realized within the x, y foot print of the LED matrix array module, contributing to miniature solutions, cost effective realization for the LED module and an acceptable form factor for front-of-car embedding.

Figure 6:
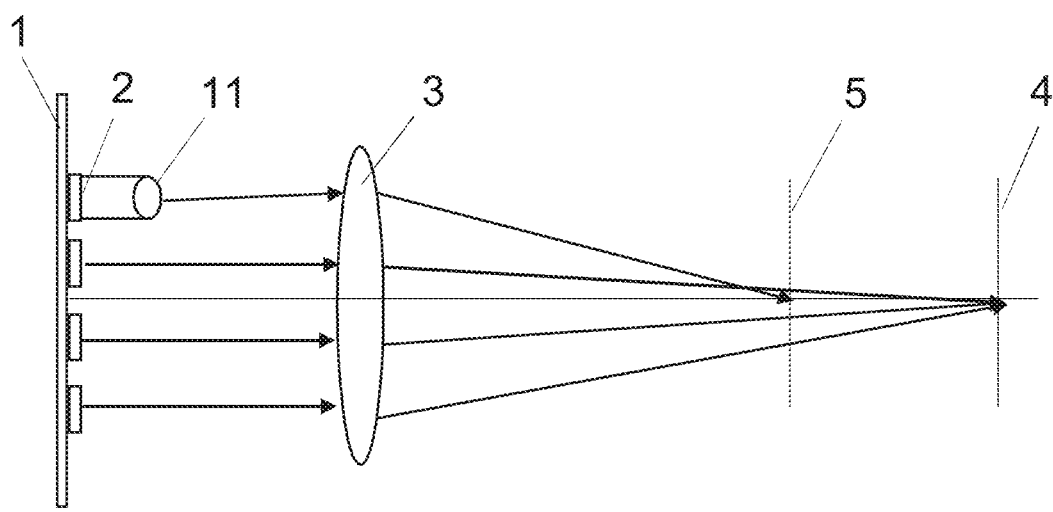
FIG. 6 a schematic illustration of a further example of a shifting element.

A further example for shifting the emission position of a LED 2 is shown in FIG. 6. In this case an additional small positive lens 11 is positioned at a certain distance from the corresponding LED 2 as shown in the figure. Lens 11 has a weak focus but in combination with the projection lens 3 can project an image closer to the projection lens 3. The additional positive lens 11 generates a virtual emission position of the corresponding LED 2 shifted further away from the projection lens 3. FIG. 6 also shows the separate imaging planes, near-by imaging plane 5 and far field imaging plane 4, to which the light emitted by the different LEDs 2 of the LED matrix 1 is focused.

Figure 3:
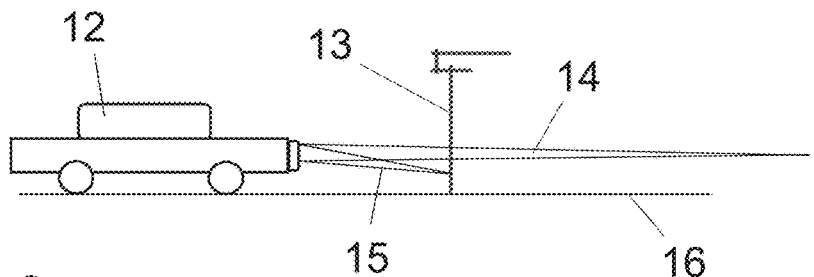
FIG. 3 a schematic illustration of a brand imaging feature enabled by the proposed lighting device.

With such a lighting device in addition to the common function of improving the vision e.g. by high beam or low beam illumination in case of a headlamp of a motor vehicle, a pattern or signature can be projected to image planes closer to the lighting device. FIG. 3 schematically illustrates such a situation in which the headlamp of a car 12 creates a far-field beam 14 and at the same time with a projecting beam 15 generates a sharp image on a garage door 13 in front of the car 12. Depending on the properties and arrangement of the shifting elements, patterns like icons or signs can be projected at different distances from the car 12 to be recognized directly by viewers or to be projected on the road 16.

Figure 4:
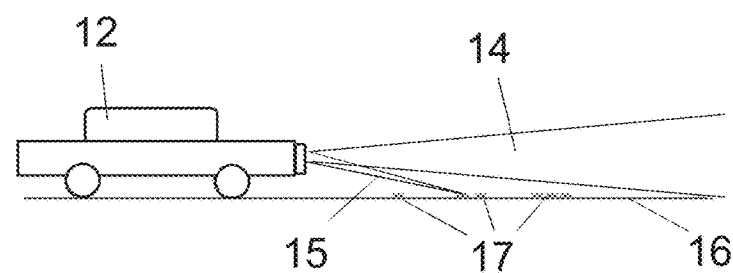
FIG. 4 a schematic illustration of a safety feature projected with the proposed lighting device.
Figure 4:
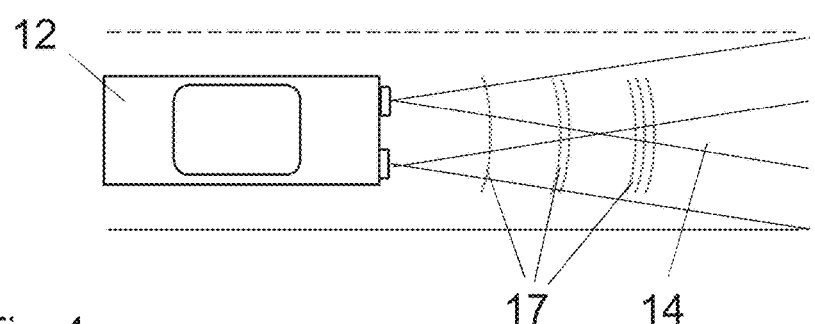

FIG. 4 shows a schematic illustration of the projection of safety features, in this example a dynamic distance indication in form of stripes 17 projected on the road 16. This figure also shows the far field beam 14 and the projection beam 15 generated by each of the two headlamps of the car 12.

Figure 7:
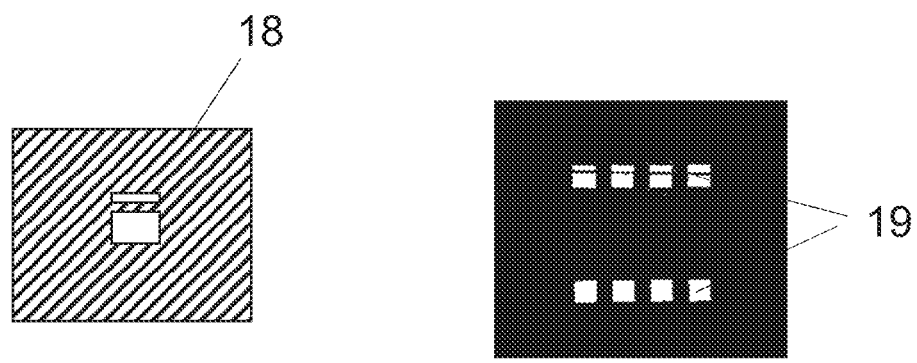
FIG. 7 an example of a mask and the corresponding projected pattern.

The projection of such patterns or signatures at different distances in front of the headlamp is realized by providing different light sources as e.g. LEDs with different shifting elements, i.e. shifting elements which shift the emission position to a different distance from the projecting optical system. A switching between the different imaging planes, if desired, can be realized by individually addressing the corresponding LEDs or groups of LEDs. In addition to such addressing of the LEDs, masking elements can be arranged in the beam path of the corresponding LEDs. FIG. 7 shows an example of such a masking element 18 on the left hand side and the corresponding projection 19 of the light of four LEDs provided with such a masking element 18 (upper row) compared to the projection 19 of four LEDs which do not provide such a masking element (lower row). With such masking elements or other light modifying elements the patterns created by the LEDs can be additionally modified.

The optical system of the proposed lighting device when used as a headlamp for motor vehicles should fulfill the cut-off requirements for automotive lighting. For the projection below the horizon there is no issue as it is designed into the optical system. However, projecting above the horizon should be carefully designed to comply with the regulations.

The shifting distance of the shifting elements in order to achieve the required image distances in front of a headlamp can be roughly calculated with the simple lens equation. As an example, the values of the object distance v for a lens with focal distance f=50 mm for an image distance b at 5 meters, 10 meters and 20 meters must be at 50.51 mm 50.25 mm and 50.13 mm respectively. Therefore, a difference of 260 microns and 120 microns between the three positions is only necessary to be realized with the shifting elements. These are values that are realistic within the LED module geometrical dimensions. Since all realistic projection lenses suffer from field curvature the focal plane is not flat but curved and the simple lens equation does not hold in detail. This phenomena however can easily be taken into account in designing the relay or shifting system. Furthermore, the plane on which the LEDs are mounted may also be curved. Also such a curvature may be taken into account.

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims. For example, the number of light sources in the array of light sources is not limited to the 2 to 4 LEDs shown in the figures. Typically, a substantially larger number of light sources is arranged in such an array. It is also obvious that the lighting device also comprises electrical connections and a housing although not shown in the figures. Apart from the use as a headlamp for vehicles the lighting device may also be used for general lighting, theatre lighting or other applications in which a spot light with various features at various throw distances is required. In the claims the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Most of the claims can be freely combined with each other and with the features of all of the other claims. Any reference signs in the claims should not be construed as limiting the scope of the invention.

LIST OF REFERENCE SIGNS

1 LED matrix array
2 LED
3 projection lens
4 far-field imaging plane
5 near-by imaging plane
6 shifting element
7 hollow reflective tube
8 light guide rod
9 micro-fiber plate
10 optical manifold
11 additional lens
12 car
13 garage door
14 far-field beam
15 projection beam
16 road
17 projected stripes
18 masking element
19 projected light pattern

The invention claimed is:

1. A lighting device for a headlamp of a vehicle, comprising:
    a projecting optical system;
    an array of light sources comprising a first light source and a second light source both mounted on a same surface and configured to emit light in a forward direction toward the projecting optical system, the light emitted by the first and second light sources focused by the projecting optical system in the forward direction; and
    at least one shifting element arranged between the first light source and the projecting optical system, the shifting element configured to generate a real or virtual shifted light emission position of the first light source that is shifted towards or away from the projecting optical system with respect to a light emission position of the second light source, such that the real or virtual shifted light emission position of the first light source is in a first object plane of the projecting optical system and the light emission position of the second light sources is in a second object plane of the projecting optical system different from the first object plane, and the projecting optical system being configured to focus light emitted by one of the first and second light source to a near-field image plane to illuminate an object at the near-field image plane, and simultaneously focus light from the other one of the first and second light source to a far-field image plane different from the near-field image plane to illuminate a road at the far-field image plane, the near-field image plane being a first distance in the forward direction from the vehicle, and the far-field image plane being a second distance in the forward direction from the vehicle different from the first distance.

2. The lighting device according to claim 1,
wherein the first light source are for providing a lighting function of a sharp projection of a signature or light pattern at one or several distances ahead of the lighting device.

3. The lighting device according to claim 1,
wherein the first and second light sources are addressable as a group or individually.

4. The lighting device according to claim 1,
wherein the first and second light sources are mounted on a common printed circuit board.

5. The lighting device according to claim 1, wherein the first and second light sources are light-emitting diodes.

6. The lighting device according to claim 1, wherein the shifting element generating real light emission positions of the light of the first light source shifted towards said projecting optical system is an optical waveguide.

7. The lighting device according to claim 6, wherein the shifting element is one of hollow reflective micro-tubes, light guiding optical rods, micro-fiber plates and light guide manifolds.

8. The lighting device according to claim 1, wherein the shifting element generating virtual light emission positions of the first light source shifted away from the projecting optical system is a converging lens.

9. The lighting device according to claim 1, wherein the projecting optical system is formed of a single lens.

10. The lighting device according to claim 1, further comprising a plurality of first light sources arranged on the same surface as the first light source and comprising the first light source, wherein at least some of the first light sources each comprise a separate shifting element.

11. The lighting device according to claim 10, wherein one or several groups of the first light sources comprise a common shifting element.

12. The lighting device according to claim 10, wherein several shifting elements are designed and arranged to generate real or virtual light emission positions of the first light sources shifted towards or away from said projecting optical system by different amounts.

13. The lighting device according to claim 1, wherein optical masking elements are arranged between the first or second light sources and the projecting optical system in order to modify or define a projected light pattern.

14. The lighting device according to claim 1, wherein the forward direction corresponds to a travelling direction of the vehicle, and the light generated by both the first and second light sources are focused at distances from the vehicle in the forward direction.

15. The lighting device according to claim 1, wherein the first light source and the second light source are mounted on a same flat plane to be a same distance from the projecting optical system as each other.

16. The lighting device according to claim 1, wherein the projecting optical system is disposed in the forward direction with respect to the real or virtual shifted light emission position of the first light source generated by the shifting element.

17. The lighting device according to claim 1, wherein the projecting optical system is configured to focus the light of the first light source without the light of the first light source being redirected between emission from the shifting element and incidence on the projecting optical system.

18. The lighting device according to claim 1, wherein the real or virtual shifted light emission position is real, and the shifting element is configured to generate the real or virtual shifted light emission position shifted towards the projecting optical system.

19. The lighting device according to claim 1, wherein the real or virtual shifted light emission position is virtual, and the shifting element is configured to generate the real or virtual shifted light emission position shifted away from the projecting optical system.

20. The lighting device according to claim 1, wherein the first light source is configured to emit light such that light from the first light source shifted by the shifting element would reach the projecting optical system without the shifting element.

* * * * *